United States Patent [19]

Miller

[11] Patent Number: 4,506,936
[45] Date of Patent: Mar. 26, 1985

[54] BEARING ASSEMBLY

[76] Inventor: Donald A. Miller, 7315 Glastonbury, Hudson, Ohio 44221

[21] Appl. No.: 474,041

[22] Filed: Mar. 10, 1983

[51] Int. Cl.³ .......................................... F16C 35/067
[52] U.S. Cl. .................................... 384/569; 384/586
[58] Field of Search .............. 308/190, 182, 196, 208, 308/209, 189 R

[56] References Cited

U.S. PATENT DOCUMENTS

| 2,768,725 | 10/1956 | Foulds et al. | 308/190 |
|---|---|---|---|
| 3,753,603 | 8/1973 | Pinner et al. | |
| 4,315,566 | 2/1982 | Greener et al. | 308/190 |
| 4,339,159 | 7/1982 | Miller. | |

*Primary Examiner*—Lenard A. Footland

[57] ABSTRACT

A bearing for registration in the end of the cylindrical tubular body of a cylindrical tubular roller of a conveyor having an inner race member, an outer race member, and discrete bearing elements positioned between said inner and said outer race members to effect relative rotation therebetween, said outer race member including an outer casing, an outwardly facing annular plate and an annular washer, both of said annular plate and washer are captured by retaining portions provided on said outer casing, said washer and said annular plate defining the outer race for said bearing elements, said outer casing having an axially outwardly facing skirt portion the end thereof being rolled-over to form a substantially U-shaped annular portion, said U-shaped annular portion of said skirt portion terminating in a lateral face which, when said bearing is inserted in the end of said conveyor roller, abuts the laterally extending face of the end of said conveyor roller, the U-shaped annular portion providing a radius of curvature at the end of said conveyor roll.

17 Claims, 3 Drawing Figures

BEARING ASSEMBLY

BACKGROUND OF THE INVENTION

This invention generally relates to an improved bearing assemblies for use and connection with conveyor rollers and more particularly to a selectively removable bearing assembly which provides for a radius of curvature at each end of the tubular cylindrical body of the conveyor roller.

Typically, prior art forms of tubular conveyor rollers involve the insertion of the bearing assembly at each end of the tubular roller body and thereafter swagging or otherwise deforming the tubular body to mechanically interconnect the bearings to said body. This technique deforms the ends of the tubular rollers thereby causing a loss of concentricity.

Additionally, it is important to provide a radius of curvature at the ends of each of the tubular rollers so as to avoid any damage to the articles being transmitted on the conveyor. For example, if a corrugated carton is placed on a conveyor having conveyor rollers without such radius of curvature then the rollers could damage the carton while in transit on the conveyor, or when being placed on or removed from the conveyor.

Further, the prior art forms of conveyor rollers are expensive to manufacture and such examples of typical prior art forms of conveyor rollers are as follows:

| U.S. Pat. Nos.: |
| --- |
| 3,301,612 |
| 3,753,603 |
| 3,897,988 |
| 4,315,566 |

My previous patent, namely, U.S. Pat. No. 4,339,159 directed to a "Conveyor Roller Bearings" and patented on July 13, 1982, has successfully addressed certain of the above noted problems. The present invention provides additional advances over prior art forms of conveyor rollers and conveyor roller bearings.

SUMMARY OF THE INVENTION

My present invention overcomes the shortcomings and problems of the prior art forms of conveyor rollers and conveyor roller bearings and provides an inexpensive and highly effective conveyor roller and bearings therefor.

Accordingly, it is a primary object of the present invention to provide a bearing for registration in the end of the cylindrical tubular body of a cylindrical tubular roller of a conveyor having an inner race member, an outer race member, and discrete bearing elements positioned between said inner and said outer race members to effect relative rotation therebetween, said outer race member including an outer casing, an outwardly facing annular plate and an annular washer, both of said annular plate and washer are captured by retaining means provided on said outer casing, said washer and said annular plate defining the outer race for said bearing elements, said outer casing having an axially outwardly facing skirt portion the end thereof being rolled-over to form a substantially U-shaped annular portion, said U-shaped annular portion of said skirt portion terminating in a lateral face which, when said bearing is inserted in the end of said conveyor roller, abuts the laterally extending face of the end of said conveyor roller, the U-shaped annular portion providing a radius of curvature at the end of said conveyor roll.

It is another object of the present invention to provide a bearing for registration in the end of the cylindrical tubular body of a cylindrical tubular roller of a conveyor wherein the outer surface of said U-shaped annular portion of said casing is flush with the outer surface of said cylindrical tubular body of said conveyor roller.

It is a further object of the present invention to provide a bearing for registration in the end of the cylindrical tubular body of a cylindrical tubular roller of a conveyor wherein said annular washer is disposed axially inwardly of said annular plate, the inner facing lateral surface of said washer being in intimate contact with the outward facing lateral face of said casing.

It is an additional object of the present invention to provide a bearing for registration in the end of the cylindrical tubular body of a cylindrical tubular roller of a conveyor wherein said inner race member is provided with an annular groove and said discrete bearing elements are a plurality of balls, said balls being positioned to rotate in said annular groove.

It is a further object of the present invention to provide a bearing for registration in the end of the cylindrical tubular body of a cylindrical tubular roller of a conveyor wherein said substantially U-shaped annular portion is formed in such a manner that the rolled-over portion of the axially outwardly facing skirt is generally in contact with the outer surface of said outer casing.

It is an additional object of the present invention to provide a bearing for registration in the end of the cylindrical tubular body of a cylindrical tubular roller of a conveyor wherein said substantially U-shaped annular portion is formed in such a manner that a gap is provided between the rolled-over portion of the axially outwardly facing skirt and the outer surface of said casing.

It it yet another object of the present invention to provide a bearing for registration in the end of the cylindrical tubular body of a cylindrical tubular roller of a conveyor wherein said retaining means are formed by the deformation of material from said outer casing.

It is still a further object of the present invention to provide a bearing for registration in the end of the cylindrical tubular body of a cylindrical tubular roller of a conveyor wherein said retaining means are a plurality of retention portions formed from the material of said outer casing and bearing against the outwardly facing lateral face of said annular plate.

It is yet an additional object of the present invention to provide a bearing for registration in the end of the cylindrical tubular body of a cylindrical tubular roller of a conveyor wherein said bearing is adapted to be removably fitted into the end of said tubular roller.

It is still an additional object of the present invention to provide a bearing for registration in the end of the cylindrical tubular body of a cylindrical tubular roller of a conveyor according to claim 9 wherein said bearing is fitted into the end of said cylindrical tubular body of said tubular roller by the provision of a plurality of axially extending ribs provided on the outer surface of said casing, said axially extending ribs being in an interference fit with the inner surface of said cylindrical tubular body of said tubular roller.

It is yet another object of the present invention to provide a bearing for registration in the end of the cylindrical tubular body of a cylindrical tubular roller of a conveyor wherein there is provided a full complement of balls rotationally disposed in said inner and outer races.

It is still a further object of the present invention to provide a bearing for registration in the end of the cylindrical tubular body of a cylindrical tubular roller of a conveyor wherein said substantially U-shaped annular portion is formed such that any distance provided by the rolled-over portion of the axially outwardly facing skirt and the outer surface of said casing may be varied to accommodate different radial thicknesses of said tubular bodies to insure a flush fit between the outer surface of said U-shaped annular portion of said casing of said bearing and said outer surface of said cylindrical tubular body of said conveyor roller.

It is yet an additional object of the present invention to provide a conveyor roller having a cylindrical tubular body, a bearing in registration in each end of said cylindrical tubular body, said bearings each having an inner race member, an outer race member, and discrete bearing elements positioned between said inner and said outer race members to effect relative rotation therebetween, said outer race member including an outer casing, an outwardly facing annular plate and an annular washer, both said annular plate and washer captured by retaining means provided on said outer casing, said washer and said annular plate defining the outer race for said bearing elements, said outer casing having an axially outwardly facing skirt portion the end thereof being rolled-over to form a substantially U-shaped annular portion, said U-shaped annular portion of said skirt portion terminating in a lateral face which abuts the laterally extending faces of each end of said conveyor roller, the U-shaped annular portion providing a radius of curvature at each end of said conveyor roll.

It is still a further object of the present invention to provide a conveyor roller wherein the inner race member of each bearing is provided with a central bore for receiving a shaft means.

It is yet an additional object of the present invention to provide a conveyor roller wherein the outer surface of said U-shaped annular portion of said casing is flush with the outer surface of said conveyor roller.

It is yet a further object of the present invention to provide a conveyor roller wherein each of said bearings are adapted to be removably fitted into each end of said cylindrical tubular body.

It is still another object of the present invention to provide a conveyor roller wherein each of said bearings are fitted into the end of said cylindrical tubular body by the provision of a plurality of axially extending ribs provided on the outer surface of said casing, axially extending ribs being in interference fit with the inner surface of said cylindrical tubular body of said tubular roller.

These and other features and objects of my invention will become apparent in the disclosure which includes the drawings and specification including the above and ongoing description and claims.

DETAILED DESCRIPTION OF THE DRAWINGS

Figure 1:
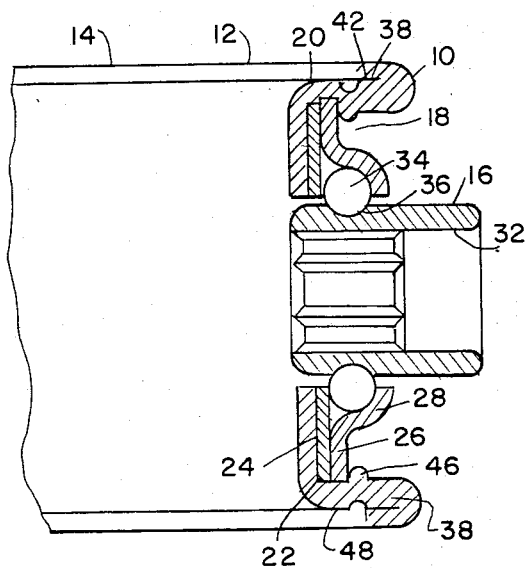
FIG. 1 is a section in side elavation on a center line of the bearing assembly in accordance with the present invention inserted in one end of a cylindrical tubular body of a cylindrical tubular roller of a conveyor.
Figure 2:
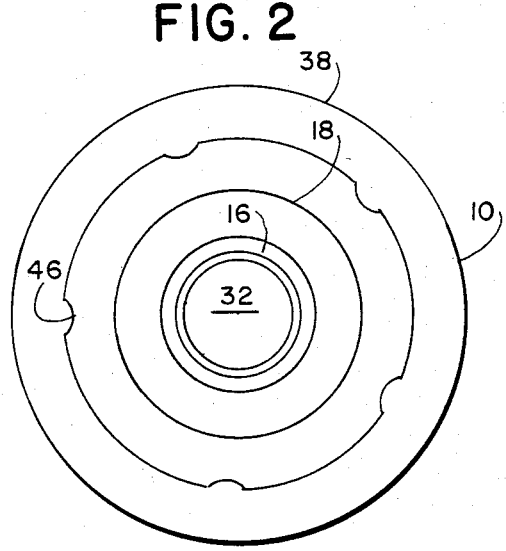
FIG. 2 is a front view in elavation of the bearing of FIG. 1.

Referring now to FIGS. 1 and 2, there is shown a bearing 10 in registration in the end of a cylindrical tubular body 12 of a conveyor roller 14. It will be appreciated that a complete conveyor roller 14 has two identical ends having a bearing 10 in registration in each end thereof.

Each bearing assembly 10 includes an inner race member 16 and an outer race member 18. The outer race member 18 includes an outer casing 20 which generally surrounds the operative components of the bearing assembly 10.

The outer race member further includes an annular washer 22 whose inwardly facing lateral face is in intimate contact with the radially extending outwardly facing lateral face 24 of the outer casing 20. The outwardly facing outer portion of the lateral face of said washer 22 is in intimate contact with an annular plate 26. The annular plate 26 is provided with a semi-spherical annular portion 28 which, along with the inner lateral face of the washer 22, defines the outer race of the bearing 10.

The inner race member 16 is provided with an annular groove 30 which defines the inner race of the bearing 10. The inner race member 16 is further provided with a central bore 32 which in turn has a series of axially extending grooves to receive a shaft (not shown).

As can be further seen in FIG. 1, there is provided a plurality of discreet bearing elements or balls 34 rotationally positioned between the inner race member 16 and the outer race member 18. More specifically, the balls 34 are rotationally disposed within an annular groove 36 provided in the outer surface of the inner race member 16. The outer race is defined by the inner surface of the semi-spherical annular portion 28 of the annular plate 26 and the outwardly facing lateral face of the annular washer 22. The bearing 10 may be provided with a full complement of balls 34 or a bearing retainer (not shown) may be provided to position a plurality of balls in the inner and outer race of the bearing 10.

The outer casing 20 is provided with an axially outwardly facing skirt portion 38 which is formed integrally with the remainder of the casing 20. The axially outwardly facing skirt portion has its end portion rolled-over to form a substantially U-shaped portion 40. The U-shaped portion terminates in a lateral face 42. As can be further seen in FIG. 1 when the bearing 10 is inserted in the end of the cylindrical tubular body 12 of the roller 14, the U-shaped portion's lateral face 42 abuts the laterally extending face 44 of the tubular body 12. The bearing in its inserted portion will have the outer surface of the casing 20 flush with the outer surface of the cylindrical tubular body so as to provide a smooth radius of curvature at each end of the roller 14.

In the embodiment of FIG. 1 the rolled-over portion of the axially outwardly facing skirt 38 is generally in contact with the outer surface of the outer casing 20.

The outer casing 20 serves an additional function in the bearing 10 in that it provides the retaining means to mechanically interlock the various components of the bearing. More specifically, a plurality of retention portions 46 are formed from the material of the outer casing 20 and the retention portions 46 mechanically bare against the outwardly facing lateral face of the annular plate 26.

Another important feature of the present invention is the selective removability of the bearing 10 from the cylindrical tubular body 12 of roller 14. More specifically, the bearing 10 can be removed from the cylindrical tubular body 12 without in any way damaging either the bearing or the tubular body 12. This is important both in terms of manufacturing the roller 14 as well as the ongoing maintenance of the roller 14. With respect to the manufacture of the roller 14 all that is required is to cut the cylindrical tubular body 12 to the desired length and then deburr the cut edges thereafter. The bearing 10 may be fitted within the cylindrical tubular body and thereafter removed for replacement and/or inspection. A plurality of axially extending ribs 48 are provided on the outer surface of the outer casing 20 to effect an interference fit between the bearing 10 and, more specifically, the outer surface of the outer casing 20 and the inner surface of the cylindrical tubular body 12 of roller 14.

Figure 3:
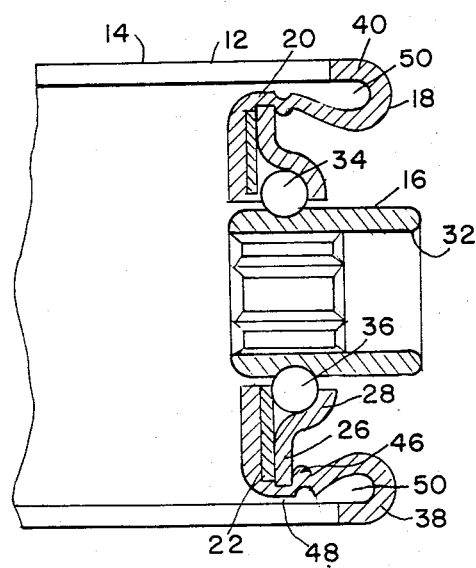
FIG. 3 is another embodiment of the bearing assembly in accordance with the present invention inserted in one end of a cylindrical tubular body of a cylindrical tubular roller of a conveyor.

Accordingly, as can be seen from the above, the bearing 10, in accordance with the present invention, embodies a number of distinct advantages over the prior art including a selective removability and the provision of a flush surface with the roller as well as providing a radius of curvature at each end of the roller. Referring now to FIG. 3, there is shown a bearing 10 essentially the same as the bearing 10 of FIG. 1 and accordingly, all referenced numerals are the same except for one important distinction. This distinction lies in the area of the axially outwardly facing skirt portion 38 and the U-shaped portion 40. While the rolled-over portion of the U-shaped portion 40 of the bearing 10 of FIG. 1 is generally in contact with the outer surface of the outer casing 20. The U-shaped portion 40 of the bearing 10 of FIG. 3 is formed so as to provide a gap 50 between it and the outer suface of the casing 20.

Two features of the bearing may be effected by the size of the gap 50, namely, the degree of radius of curvature at the end of the cylindrical tubular body 12 as well as accommodating any variations in the thickness or gage of the material used to form the cylindrical tubular body 12. With respect to the former feature, a greater radius of curvature can be achieved generally when the gap 50 is increased. With repsect to the latter feature, the gap 50 can be varied to accommodate different thicknesses of the cylindrical tubular body 12 to maintain the flush relationship between the body 12 and the outer surface of the outer casing 20.

The material utilized in the manufacture of the various components of the bearing 10 can be selected from generally and readily available materials such as cold-rolled steel.

The cylindrical tubular body 12 may also be manufactured from a wide variety of suitable materials such as aluminum and steel. Additionally, various components of the bearing can be suitably coated depending upon different applications and environments.

While the description set forth in the principles of my invention is in connection with the specific apparatus, it is to be understood that the description is made only by way of example and not as a limitation of the scope of the invention set forth in the objects thereof and in the accompanying claims.

What is claimed is:

1. A bearing for registration in the end of the cylindrical tubular body of a cylindrical tubular roller of a conveyor having an inner race member, an outer race member, and discrete bearing elements positioned between said inner and said outer race members to effect relative rotation therebetween, said outer race member including an outer casing, an outwardly facing annular plate and an annular washer, both of said annular plate and washer are captured by retaining means provided on said outer casing, said washer and said annular plate defining the outer race for said bearing elements, said outer casing having an axially outwardly facing skirt portion the end thereof being rolled-over to form a substantially U-shaped annular portion, said U-shaped annular portion of said skirt portion terminating in a lateral face which, when said bearing is inserted in the end of said conveyor roller, abuts the laterally extending face of the end of said conveyor roller, the U-shaped annular portion providing a radius of curvature at the end of said conveyor roll.

2. A bearing for registration in the end of the cylindrical tubular body of a cylindrical tubular roller of a conveyor according to claim 1 wherein the outer surface of said U-shaped annular portion of said casing is flush with the outer surface of said cylindrical tubular body of said conveyor roller.

3. A bearing for registration in the end of the cylindrical tubular body of a cylindrical tubular roller of a conveyor according to claim 1 wherein said annular washer is disposed axially inwardly of said annular plate, the inner facing lateral surface of said washer being in intimate contact with the outward facing lateral face of said casing.

4. A bearing for registration in the end of the cylindrical tubular body of a cylindrical tubular roller of a conveyor according to claim 1 wherein said inner race member is provided with an annular groove and said discrete bearing elements are a plurality of balls, said balls being positioned to rotate in said annular groove.

5. A bearing for registration in the end of the cylindrical tubular body of a cylindrical tubular roller of a conveyor according to claim 4 wherein there is provided a full complement of balls rotationally disposed in said inner and outer races.

6. A bearing for registration in the end of the cylindrical tubular body of a cylindrical tubular roller of a conveyor according to claim 1 wherein said substantially U-shaped annular portion is formed in such a manner that the rolled-over portion of the axially outwardly facing skirt is generally in contact with the outer surface of said outer casing.

7. A bearing for registration in the end of the cylindrical tubular body of a cylindrical tubular roller of a conveyor according to claim 1 wherein said substantially U-shaped annular portion is formed in such a manner that a gap is provided between the rolled-over portion of the axially outwardly facing skirt and the outer surface of said casing.

8. A bearing for registration in the end of the cylindrical tubular body of a cylindrical tubular roller of a conveyor according to claim 1 wherein said retaining means are formed by the deformation of material from said outer casing.

9. A bearing for registration in the end of the cylindrical tubular body of a cylindrical tubular roller of a conveyor according to claim 8 wherein said retaining means are a plurality of retention portions formed from the material of said outer casing and bearing against the outwardly facing lateral face of said annular plate.

10. A bearing for registration in the end of the cylindrical tubular body of a cylindrical tubular roller of a conveyor according to claim 1 wherein said bearing is adapted to be removably fitted into the end of said tubular roller.

11. A bearing for registration in the end of the cylindrical tubular body of a cylindrical tubular roller of a conveyor according to claim 10 wherein said bearing is fitted into the end of said cylindrical tubular body of said tubular roller by the provision of a plurality of axially extending ribs provided on the outer surface of said casing, said axially extending ribs being in an interference fit with the inner surface of said cylindrical tubular body of said tubular roller.

12. A bearing for registration in the end of the cylindrical tubular body of a cylindrical tubular roller of a conveyor according to claim 1, wherein said substantially U-shaped annular portion is formed such that any distance provided by the rolled-over portion of the axially outwardly facing skirt and the outer surface of said casing may be varied to accommodate different radial thicknesses of said tubular bodies to insure a flush fit between the outer surface of said U-shaped annular portion of said casing of said bearing and said outer surface of said cylindrical tubular body of said conveyor roller.

13. A conveyor roller having a cylindrical tubular body, a bearing in registration in each end of said cylindrical tubular body, said bearings each having an inner race member, an outer race member, and discrete bearing elements positioned between said inner and said outer race members to effect relative rotation therebetween, said outer race member including an outer casing, an outwardly facing annular plate and an annular washer, both said annular plate and washer captured by retaining means provided on said outer casing, said washer and said annular plate defining the outer race for said bearing elements, said outer casing having an axially outwardly facing skirt portion the end thereof being rolled-over to form a substantially U-shaped annular portion, said U-shaped annular portion of said skirt portion terminating in a lateral face which abuts the laterally extending faces of each end of said conveyor roller, the U-shaped annular portion providing a radius of curvature at each end of said conveyor roll.

14. A conveyor roller according to claim 13 wherein the inner race member of each bearing is provided with a central bore for receiving a shaft means.

15. A conveyor roller according to claim 13 wherein the outer surface of said U-shaped annular portion of said casing is flush with the outer surface of said conveyor roller.

16. A conveyor roller according to claim 13 wherein each of said bearings are adapted to be removably fitted into each end of said cylindrical tubular body.

17. A conveyor roller according to claim 16 wherein each of said bearings are fitted into the end of said cylindrical tubular body by the provision of a plurality of axially extending ribs provided on the outer surface of said casing, axially extending ribs being in interference fit with the inner surface of said cylindrical tubular body of said tubular roller.

* * * * *